United States Patent [19]

Gartner et al.

[11] Patent Number: 4,943,323

[45] Date of Patent: Jul. 24, 1990

[54] PROCESSING ADDITIVES FOR BLENDED CEMENTS

[75] Inventors: Ellis M. Gartner, Silver Spring; David F. Myers, Columbia; James M. Gaidis, Ellicott City, all of Md.

[73] Assignee: W. R. Grace & Co.-Conn., New York, N.Y.

[21] Appl. No.: 418,437

[22] Filed: Oct. 6, 1989

[51] Int. Cl.$^5$ ............................................. C04B 24/00
[52] U.S. Cl. .................................... 106/808; 106/781; 106/727; 106/735
[58] Field of Search ........................ 106/89, 90, 92, 93, 106/97

[56] References Cited

U.S. PATENT DOCUMENTS

| | | |
|---|---|---|
| 2,437,842 | 3/1948 | Uhler . |
| 2,776,901 | 1/1957 | Scripture . |
| 2,776,902 | 1/1957 | Scripture . |
| 2,776,903 | 1/1957 | Scripture . |
| 3,202,521 | 8/1965 | Lorenzen . |
| 4,318,774 | 3/1982 | Dodson . |
| 4,373,956 | 2/1983 | Rosskopf . |
| 4,401,472 | 8/1983 | Gerber . |
| 4,473,405 | 9/1984 | Gerber . |
| 4,488,910 | 12/1984 | Nicholson et al. . |
| 4,519,842 | 5/1985 | Gerber . |
| 4,606,770 | 8/1986 | Gerber . |
| 4,828,624 | 5/1989 | Valle . |

FOREIGN PATENT DOCUMENTS

| | | |
|---|---|---|
| 867323 | 6/1970 | Italy . |
| 83/02938 | 9/1983 | World Int. Prop. O. . |

*Primary Examiner*—William R. Dixon, Jr.
*Assistant Examiner*—Chris Gallo
*Attorney, Agent, or Firm*—Howard J. Troffkin

[57] ABSTRACT

This invention relates to a method of enhancing the later age strength of certain blended cements. Under the process of this invention, certain blended cements, in particular those made from cement clinkers containing at least 4% $C_4AF$, when mixed with up to 0.2% triisopropanolamine exhibit a marked increase in 7 and 28-day compressive strengths. The blended cements of this invention contain between 5 and 60% fillers or clinker substitutes. The triisopropanolamine strength enhancing additive may be admixed with the cement powder or may be interground with the cement clinker during finish milling.

25 Claims, No Drawings

PROCESSING ADDITIVES FOR BLENDED CEMENTS

BACKGROUND OF THE INVENTION

1. Field of the Invention

This invention relates to a strength enhanced blended cement, and more specifically to a hydraulic blended cement containing an additive which may be interground with cement clinker to improve grinding efficiency or may be intermixed with the powdered cement prior to or in conjunction with the addition of water and which improves the strength-set time profile of the blended cement to a level substantially equivalent to high quality portland cement.

2. Description of the Prior Art

The term cement is used to designate many different kinds of materials useful as binders or adhesives. Hydraulic cements are powdered materials which, when mixed with water, form a paste that hardens slowly to form rock-hard products such as mortar or concrete. Portland cement is distinguished from other cements by the different components of which it is composed, and the requirement that it meet particular standard specifications established in each country (see *Cement Standards of the World*, Cembureau, Paris, Fr.) For example, in the United States, the American Society for Testing and Materials (ASTM), American Association of State Highway and Transportation Officials, as well as other government agencies, have set certain basic standards for cement which are based on principal chemical composition requirements of the clinker and principal physical property requirements of the final cement mix. For purposes of this invention the term portland cement is intended to include all cementitious compositions which meet the requirements of the ASTM (as designated by ASTM Specification C150).

Portland cement is prepared by sintering a mixture of components including calcium carbonate (as limestone), aluminum silicate (as clay or shale), silicon dioxide (as sand) and miscellaneous iron oxides. During the sintering process, chemical reactions take place wherein hardened nodules, commonly called clinkers, are formed. Portland cement clinker is formed by the reaction of calcium oxide with acidic components to give primarily tricalcium silicate, dicalcium silicate, tricalcium aluminate, and a ferrite solid solution phase approximating tetracalcium aluminoferrite. For purposes of this invention, the variable compositions encompassing the calcium ferrite solid solution will be referred to as tetracalcium aluminoferrite. The conventional cement chemists notation uses the following abbreviations:

$$CaO = C$$
$$SiO_2 = S$$
$$Al_2O_3 = A$$
$$Fe_2O_3 = F$$

thus:
tricalcium silicate = $C_3S$
dicalcium silicate = $C_2S$
tricalcium aluminate = $C_3A$
tetracalcium aluminoferrite = $C_4AF$ After the clinker has cooled, it is then pulverized together with a small amount of gypsum (calcium sulfate) in a finish grinding mill to provide a fine, homogeneous powdery product known as portland cement. Due to the extreme hardness of the clinkers, a large amount of energy is required to properly mill them into a suitable powder form. Energy requirements for finish grinding can vary from about 33 to 77 kW h/ton depending upon the nature of the clinker. Several materials such as glycols, alkanolamines, amine acetates, aromatic acetates, etc., have been shown to reduce the amount of energy required and thereby improve the efficiency of the grinding of the hard clinkers. These materials, commonly known as grinding aids, are processing additives which are introduced into the mill in small dosages and interground with the clinker to attain a uniform powdery mixture. In addition to reducing grinding energy, the commonly used processing additives listed above are frequently used to improve the ability of the powder to flow easily and reduce its tendency to form lumps during storage.

Because of the rigid compositional and physical requirements for forming suitable portland cement clinker, clinker becomes a relatively expensive raw material. For certain applications, it is possible to substitute less expensive fillers such as limestone or clinker substitutes such as granulated blast furnace slags, natural or artificial pozzolana, and the like, for a portion of the clinker. As used herein, the term filler refers to an inert material that has no later age strength enhancing attributes; the term "clinker substitute" refers to a material that may contribute to long term compressive strength enhancement, but usually exhibits little or no enhancement of 7 or 28-day compressive strength values. The addition of these fillers or clinker substitutes to form "Blended Cements" is limited in practice by the fact that such addition usually results in a diminution in the physical strength properties of the resultant cement. For example, when a filler such as limestone is blended in amounts greater than 5%, the resultant cement exhibits a marked reduction in strength, particularly with respect to the strength attained after 28 days of moist curing (28-day strength). The 28-day strength has particular significance and will be emphasized throughout this invention since it is the strength at this age which is most commonly used to assess the engineering properties of the final cement products. As used herein, the term "Blended Cements" refers to hydraulic cement compositions containing between 5 and 60% fillers or clinker substitute materials.

Various other additives may be added to cement to alter the physical properties of the final cement. For example, alkanolamines such as monoethanolamine, diethanolamine, triethanolamine and the like are known to shorten the set time as well as enhance the one-day compressive strength of cements. However, these additives usually have little beneficial effect on the 28-day set strength of the finished cement and in some cases may actually diminish it. Various other polymeric amines and imines have been used as 28-day cement strength enhancers, however, due to the high costs of these additives, their use is somewhat limited.

It has now been discovered that triisopropanolamine (TIPA), which was previously believed to possess the equivalent cement additive properties as triethanolamine (TEA) (i.e., shortening set times and enhancing one-day compressive strengths,) surprisingly exhibits unique 7 and 28-day compressive strength enhancing properties when added to certain hydraulic blended cements. Suitable hydraulic blended cements for use in the invention are those made from cement clinkers containing at least 4% tetra calcium aluminoferrite ($C_4AF$) by weight. The enhanced 7 and 28-day strength exhibited by these cements were unexpected and unobvious since $C_4AF$ was believed to have no cementing value.

Summary of the Invention

It is an object of this invention to provide a hydraulic blended cement, prepared from a mixture of clinker, gypsum and a high proportion of filler or clinker substitute, together with a strength enhancing additive wherein the blended cement exhibits a 7 and 28-day strength profile in conformance with portland cement minimum standards.

Another object of this invention is to provide a cement additive that is effective as a grinding aid, improves the ability of the ground cement powder to flow easily, reduces the tendency of the cement to form lumps during storage, and enhances the 7 and 28-day strength.

Another object of this invention is to provide a process to enhance the 7 and 28-day strength of blended cements to a level in conformance with portland cement minimum standards.

In accordance with the present invention, there have been provided certain hydraulic blended cements comprising a mixture of clinker, gypsum and from 5 to 60% fillers or clinker substitutes wherein the clinker contains at least 4% $C_4AF$, which when mixed with an additive comprising triisopropanolamine produces a hydraulic blended cement that exhibits the equivalent physical 7 and 28-day compressive strength properties of portland cement.

Also provided in accordance with this invention is a method of preparing enhanced strength hydraulic blended cements comprising intergrinding a mixture of clinker containing at least 4% $C_4AF$, gypsum and between 5% and 60% by weight filler or clinker substitute, together with an additive that is effective as a grinding aid, improves the ability of the ground cement to flow easily, reduces the tendency of the cement to form lumps during storage, and enhances the 7 and 28-day strength, said additive comprising triisopropanolamine.

Detailed Description

The present invention is directed to an enhanced strength, hydraulic blended cement having a 7 and 28-day compressive strength in conformance with the minimum standards of a portland cement as defined in ASTM C150. These enhanced strength hydraulic blended cements are prepared by incorporating a strength enhancing additive into a suitable, hydraulic blended cement. The strength enhancing additive is comprised of triisopropanolamine (TIPA), and is added to the cement in an amount up to 0.2%, preferably less than 0.1%, and most preferably between 0.005% and 0.03%, based on the weight of the cement. The additive can be in its neat (amine) form or may be in its neutralized form such as an acetate, gluconate, sulfate, nitrate, nitrite, and the like. Further, the additive may be converted into its ester form (e.g. an acetate ester), since, upon addition to the high pH of a hydrating cement, it will undergo hydrolysis and revert back to the alcohol.

A particular advantage of this additive is that it may be either interground or intermixed with the cement. As used herein, the terms "interground" and "intermixed" refer to the particular stage of the cement processing in which the TIPA is added. Since TIPA is an effective grinding aid, it may be added to the clinker during the finish grinding stage and thus interground to reduce the energy requirements and provide a uniform free flowing cement powder with reduced tendency to form lumps during storage. It is also possible to add TIPA as an admixture to powdered cement either prior to, in conjunction with, or after the addition of water when effecting the hydraulic setting of the cement. Further, the additive of this invention may be supplied in a pure concentrated form, or diluted in aqueous or organic solvents, and may also be used in combination with other chemical admixtures, including but not limited to: accelerating admixtures, air entrainers, air detrainers, water-reducing admixtures, retarding admixtures (as defined in ASTM C494) and the like, and mixtures thereof. The additive may be in its neat (amine) form or may be in its neutralized form such as an acetate, gluconate, sulfate, nitrate, nitrite, and the like. Further, the additive may be converted into its ester form (e.g an acetate ester), since upon addition to the high pH of a hydrating cement, it will undergo hydrolysis and revert back to the alcohol form.

Suitable blended cements for use in this invention are those made from cement clinkers which contain at least 4% tetracalcium aluminoferrite, ($C_4AF$), preferably greater than 5.5% $C_4AF$, and most preferably greater than 7% $C_4AF$. The effectiveness of TIPA relates to the amount of $C_4AF$ in the clinker. Clinkers with low $C_4AF$ contents, either due to low total iron or to a preponderance of $Fe^{II}$ at the temperature of solidification of the clinker melt phase, or for any other reason, are less affected by the strength enhancing effects of TIPA. During $C_4AF$ hydration, ferric ions are produced in solution as a byproduct. Since ferric ions are extremely insoluble at the high pH found in hydrating cement, they immediately precipitate as an amorphous ferric hydroxide gel. This gel coats the cement grain and tends to retard hydration of the cement as a whole. TIPA serves to complex with the iron at high pH and helps to remove this iron-rich coating, thereby improving the strength development of the cement. The table in example 3 clearly illustrates the variation in strength enhancement at 28 days when TIPA was added to cements varying in $C_4AF$ concentration.

The current method to determine the concentration of $C_4AF$ in a cement is by the Bogue calculation, as specified in ASTM C150. This calculation provides an estimate of the concentration of the major phases present in a cement based on an elemental analysis. The values obtained may however, be inaccurate in many cases because the Bogue calculation does not account for differences that may occur in the thermal processing history of the cement clinker or for the presence of minor components. Because the Bogue calculation assumes the iron is present only in the $C_4AF$ phase, the calculated values for the $C_4AF$ concentration will be in excess of the actual value when a significant fraction of the iron in a cement is present in phases other than $C_4AF$. For example, in the case of cement "L" (as illustrated in examples 3 and 7), the $C_4AF$ concentration based on the Bogue calculation is close to the normal concentration levels of the other cements, but it actually contains a low $C_4AF$ level. This suggests that the iron in this cement is not present in the $C_4AF$ solid solution as is normally the case (and assumed by the Bogue calculation), but is instead located in other phases.

For purposes of this invention, the concentration of $C_4AF$ in a cement will be calculated using data derived by x-ray diffraction (XRD) since this method is representative of the actual $C_4AF$ concentration. Under this method, a cement sample is scanned in the region 30° to 35° 2θ (CuKα). The heights of the 141 $C_4AF$ peak [$h(C_4AF)$] at 33.8° and the 440 $C_3A$ peak [$h(C_3A)$] at 33.3° are measured and the ratio of the 141 $C_4AF$ peak height to the 440 $C_3A$ peak height is determined. This peak height ratio is proportional to the actual $C_4AF/C_3A$ concentration ratio. However, the proportionality constant (K) is not known and cannot be measured in an unambiguous way. In order to estimate this constant, the $C_4AF/C_3A$ concentration ratio was estimated from Bogue calculated values for these two phases in cements where the Bogue calculation is expected to be accurate. These Bogue-calculated $C_4AF/C_3A$ concentration ratios were then divided by the calculated peak height ratio from XRD to determine the proportionality constant, K. K was computed for 10 cements and found to have a value of $1.39 \pm 0.47$.

Next, this value of K, the XRD data, and the Bogue elemental analysis was used to compute the actual $C_4AF$ content for each cement. In order to do this, a mass balance was performed for alumina in the cement. The fact that all of the alumina must appear in the cement as $C_3A$, $C_4AF$, or as an impurity in the silicate phases can be expressed mathematically as $$A^{Total} = A^{C_3A} + A^{C_4AF} + \delta A^{Total}$$

where δ is defined to be the fraction of alumina which appears in the silicate phases. This equation can be rearranged to yield $$A^{Total}(1-\delta) = A^{C_4AF}(1 + A^{C_3A}/A^{C_4AF})$$

The ratio $A^{C_4AF}/A^{C_3A}$ is related to the ratio $[C_4AF]/[C_3A]$ by the stoichiometry of the compounds involved, so that $$A^{C_4AF}/A^{C_3A} = 0.556 \, [C_4AF]/[C_3A].$$

A new constant, K*, can be defined such that $$A^{C_4AF}/A^{C_3A} = K^* \, (h(C_4AF)/h(C_3A)),$$

where $K^* = 0.556 \, K$, K being the constant of proportionality defined above. Defining the peak-height ratio $$h(C_4AF)/h(C_3A) = r.$$

the mass balance can be rewritten $$A^{C_4AF} = A^{Total}(1-\delta)/(1 + 1/K^* r).$$

When the stoichiometric relationship between $C_4AF$ and A is employed, this can be written in the final form $$[C_4AF] = 4.77 \, A^{Total}(1-\delta)/(1 + 1/K^* r).$$

In general, the value of δ to be used in this equation is not known. However, an estimate of the $C_4AF$ content can be obtained by assuming that all of the alumina is in the $C_3A$ and $C_4AF$ phases, or $\delta = 0$. This estimate will give the highest possible value for the $C_4AF$ concentration threshold. Any value of $\delta > 0$ will lower the threshold below that computed for $\delta = 0$. Using this value for δ, the value of K cited above, the value for r obtained from the XRD experiments, and the alumina content from the elemental analysis, the $C_4AF$ concentration can be computed for any cement. The $C_4AF$ concentration was calculated for several cements, as shown in the column on the right in Table VII in example 7. (Note - The $C_4AF$ content of three cements (K, L, and O) were also measured using a technique described in Bulletin 166 of the Research and Development Laboratories of the Portland Cement Association. The $C_4AF$ content measured according to this bulletin agreed well with the $C_4AF$ concentration values obtained by XRD data in all these cases, whereas the Bogue calculated $C_4AF$ concentration values were inaccurate in two of the three cements (L and O)).

Using these computed $C_4AF$ concentrations, it appears that all of the cements in which TIPA provided strength enhancement have a $C_4AF$ concentration greater than 4%, whereas the two cements in which no strength enhancement was obtained have a $C_4AF$ concentration less than 4%. It is apparent, then, that a $C_4AF$ concentration greater than 4%, preferably greater than 5.5% and most preferably greater than 7% is required for TIPA to provide useful strength enhancement at 7 and 28 days.

It has been observed that the addition of TIPA to cements, while enhancing the later age strength of the cement, also tends to increase the amount of air entrained in the cement. Analysis of various cement samples revealed an increase in air entrainment in excess of 2% when compared to cements containing no additive. Thus, a preferred embodiment of this invention comprises a stable, homogeneous mixture of the strength enhancing additive and an air detraining agent (ADA) capable of reducing or eliminating the increased air entrainment in the cement.

Various air detraining agents are known to those skilled in the art, and a choice of a particular agent is not critical per se to this invention, provided however that it is compatible with TIPA (i.e., non-degrading) and TIPA is soluble therein, or can be made soluble therein by the addition of further ingredients. Suitable air detraining agents include, but are not limited to, nonionic surfactants such as phosphates including tributylphosphate, phthalates including diisodecylphthlalate, block copolymers including polyoxypropylene-polyoxyethylene-block copolymers, and the like.

The TIPA/ADA mixture may be admixed with the cement powder, or is preferably interground with the cement clinker. When intergrinding these additive TIPA/ADA mixtures with the cement clinker during finish milling, it is important to choose an ADA which is relatively non-volatile to withstand the heat generated by the mill and thus not evaporate. The most preferred ADAs for use when intergrinding with the cement clinker are nonionic polyoxypropylene- polyoxyethylene block copolymers having a molecular weight of at least 2500.

The ratio of TIPA to ADA in the mixture is typically in the range of 1:(0.1-2) based on weight, and is preferably in the range 1:(0.15–0.40). The TIPA/ADA mixture can be added to cements in a dosage of up to 0.2% based on the TIPA content, preferably less than 0.1% and most preferably between 0.005 and 0.03%.

Without further elaboration, it is believed that one skilled in the art, using the preceding detailed description, can utilize the present invention to its fullest extent. The following examples are provided to illustrate the invention, but are not to be construed as limiting the invention in any way except as indicated in the appended claims. All parts and percentages are by weight unless otherwise indicated and additives are expressed as percent active ingredient as solids based on the weight of dry cement (% s/c). Compressive strengths of the cement samples were determined in accordance with ASTM method C109.

The following examples were prepared using commercially available cements and clinkers. The following table (Table A) provides an elemental analysis of the cements and clinker as oxides and the corresponding clinker compound compositional analysis as calculated by the Bogue method (ASTM C150). The sample codes as used in this table will be used throughout the following examples to indicate which cements were used therein.

ker were obtained and analyzed for $C_4AF$ content by x-ray diffraction. As indicated in Table I, all three cement clinkers contained greater than 4% $C_4AF$. The limestone blended cements were produced by mixing 2500 g of a mixture of clinker, gypsum, and limestone in a laboratory ball mill and grinding the mixture to a fine powder by revolving the mill 4000 times. The resulting cement was used to produce ASTM C109 mortars. The relative strength of limestone blended cement as compared to a portland cement was determined by producing cements with the following compositions:

(1) blank (no limestone or TIPA)
(2) TIPA only
(3) limestone only
(4) limestone and TIPA.

The samples were allowed to cure to an age of 28 days under limewater, and then evaluated for relative strength. The $C_4AF$ concentrations were determined by x-ray diffraction analysis for each of the cements. Table I below shows a significant 28-day strength enhancement obtained in the limestone blended cements containing 0.02% TIPA as compared to the ordinary portland cement.

TABLE A

Analyses of Cements and Clinkers
Elemental Analysis As Oxides % by Mass

| Cement | Na$_2$O | K$_2$O | MgO | CaO | Al2O3 | Fe2O3 | SiO2 | TiO2 | P2O5 | SO3 | L.O.I. | SrO | Mn2O3 | Total |
|---|---|---|---|---|---|---|---|---|---|---|---|---|---|---|
| A | 0.08 | 0.59 | 0.71 | 64.51 | 4.36 | 3.43 | 21.40 | 0.18 | 0.03 | 2.85 | 1.21 | 0.03 | 0.04 | 99.42 |
| B | 0.00 | 0.74 | 3.29 | 65.74 | 4.25 | 2.74 | 21.46 | 0.20 | 0.04 | 0.86 | 0.59 | 0.03 | 0.05 | 99.98 |
| C | 0.31 | 0.40 | 1.97 | 65.78 | 3.86 | 3.01 | 22.44 | 0.24 | 0.07 | 0.58 | 0.43 | 0.22 | 0.09 | 99.40 |
| D | 0.28 | 0.55 | 3.80 | 64.50 | 4.60 | 3.60 | 21.60 | 0.20 | 0.10 | 0.61 | 0.08 | 0.00 | 0.00 | 99.92 |
| E | 0.21 | 0.38 | 3.55 | 63.25 | 4.40 | 2.91 | 21.45 | 0.23 | 0.07 | 2.54 | 0.99 | 0.00 | 0.00 | 99.98 |
| F | 0.15 | 0.63 | 0.86 | 64.65 | 4.22 | 3.37 | 21.51 | 0.18 | 0.05 | 2.80 | 1.38 | 0.05 | 0.05 | 99.90 |
| G | 0.12 | 0.66 | 4.22 | 63.77 | 4.46 | 2.89 | 22.24 | 0.29 | 0.06 | 0.33 | 0.25 | 0.12 | 0.08 | 99.49 |
| H | 0.18 | 0.83 | 2.06 | 65.00 | 4.12 | 3.32 | 22.54 | 0.23 | 0.10 | 1.00 | 0.15 | 0.07 | 0.06 | 99.56 |
| I | 0.29 | 0.54 | 0.00 | 65.00 | 5.00 | 3.00 | 22.00 | 0.00 | 0.00 | 2.00 | 0.00 | 0.00 | 0.00 | 97.83 |
| J | 0.37 | 0.21 | 1.84 | 64.56 | 5.51 | 2.74 | 20.93 | 0.24 | 0.07 | 1.98 | 1.12 | 0.12 | 0.04 | 99.73 |
| K | 0.10 | 1.10 | 1.72 | 64.91 | 5.81 | 2.60 | 21.75 | 0.33 | 0.05 | 1.33 | 0.00 | 0.00 | 0.00 | 99.70 |
| L | 0.12 | 0.22 | 1.14 | 67.25 | 6.12 | 2.44 | 21.89 | 0.26 | 0.11 | 0.02 | 0.00 | 0.00 | 0.00 | 99.57 |
| M | 0.04 | 0.45 | 1.60 | 65.48 | 4.85 | 0.19 | 21.73 | 0.20 | 0.00 | 2.97 | 2.03 | 0.00 | 0.00 | 99.54 |
| N | 0.00 | 0.71 | 1.13 | 65.28 | 6.03 | 4.28 | 20.45 | 0.45 | 0.00 | 1.59 | 0.71 | 0.00 | 0.00 | 100.63 |
| O | 0.10 | 0.38 | 0.84 | 65.44 | 2.92 | 4.67 | 24.24 | 0.44 | 0.14 | 0.08 | 0.00 | 0.00 | 0.00 | 99.15 |
| P | 0.00 | 0.33 | 1.31 | 62.08 | 6.17 | 3.46 | 20.53 | 0.37 | 0.00 | 3.67 | 1.04 | 0.00 | 0.00 | 99.46 |
| Q | 0.45 | 0.28 | 2.73 | 60.95 | 3.77 | 2.19 | 21.59 | 0.30 | 0.00 | 2.55 | 1.92 | 0.00 | 0.00 | 96.73 |

Clinker Compound Compositions
Cement Compounds ASTM C150

| Cement | C3S | C2S | C3A | C4AF | Compd. Totals |
|---|---|---|---|---|---|
| A | 56.25 | 18.92 | 6.31 | 10.44 | 91.91 |
| B | 68.00 | 10.23 | 7.26 | 8.34 | 98.83 |
| C | 63.27 | 16.60 | 5.96 | 9.16 | 94.99 |
| D | 58.61 | 17.71 | 6.89 | 10.95 | 94.17 |
| E | 51.49 | 22.65 | 7.53 | 8.86 | 90.53 |
| F | 57.01 | 18.66 | 6.09 | 10.25 | 92.02 |
| G | 53.20 | 23.63 | 7.86 | 8.79 | 93.48 |
| H | 55.82 | 22.51 | 6.18 | 10.10 | 94.61 |
| I | 53.83 | 22.46 | 8.17 | 9.13 | 93.60 |
| J | 55.09 | 18.45 | 10.79 | 8.34 | 92.66 |
| K | 49.85 | 24.75 | 12.00 | 7.91 | 94.52 |
| L | 60.26 | 17.29 | 13.07 | 7.42 | 98.05 |
| M | 58.75 | 17.98 | 13.06 | 0.58 | 90.37 |
| N | 56.15 | 16.28 | 9.93 | 13.02 | 95.37 |
| O | 52.52 | 29.59 | 1.37 | 14.21 | 97.69 |
| P | 37.35 | 30.68 | 11.48 | 10.53 | 90.04 |
| Q | 46.30 | 26.97 | 7.08 | 6.66 | 87.01 |

Example 1

This example illustrates the enhanced strength obtained by limestone blended cements (LBC) relative to portland cements (PC) when interground with triisopropanolamine. Three samples of portland cement clin-

TABLE I

Strength Enhancement with TIPA in Limestone Blended Cements

| Clinker | % C$_4$AF | Cement | 28 Day Strength, psi Blank | 28 Day Strength, psi 0.02% TIPA | Strength Enhancement % |
|---|---|---|---|---|---|
| D | 9.99 | PC | 6850 | 7460 | +9 |
|   |      | LBC | 4200 | 4900 | +17 |
| H | 8.38 | PC | 6630 | 7990 | +21 |
|   |      | LBC | 4020 | 4970 | +24 |
| C | 8.83 | PC | 6940 | 7570 | +9 |
|   |      | LBC | 5230 | 6470 | +24 |

Note:
PC = Portland Cement (95% clinker, 5% gypsum)
LBC = Limestone Blended Cement (75% clinker, 20% limestone, 5% gypsum)

Example 2

This example illustrates the unexpected superiority of TIPA as a 7 and 28-day strength enhancer when compared to triethanolamine (TEA).

A number of limestone blended cements were produced by combining 2500 g of a mixture of clinker, gypsum, limestone, and the desired processing additive in a laboratory ball mill, and grinding the materials to a fine powder by revolving the mill 4000 times. Unless otherwise noted, the composition of each cement was 1875 g clinker, 500 g limestone, and 125 g gypsum. Standard mortars were produced with these cements using the procedure specified in ASTM C109 (w/c=0.485, sand/cement=2.75), and compressive strengths of 2 inch cubes made with the mortars measured at 1, 7 and 28 days. For each clinker used, at least two cements were produced: one with no addition of processing additive, and one in which 0.5 g of TIPA was added to the 2500 g batch of cement (a 0.02% addition) after the initial 100 revolutions of the mill. In some cases a third cement was produced in which 0.5 of TEA was substituted for TIPA. Table II below shows that for each clinker used, the 28 day compressive strength of the cements containing TIPA exceeded that of the control and, where applicable, the cements containing TEA, except for cement L, which has a C$_2$AF content less than 4%. At 7 days, TIPA outperformed the control and TEA for all but cements L and O.

TABLE IIa

Results of 1 Day Strength Tests with Laboratory Ground Portland Cements

| Clinker | Control | TIPA | TEA |
|---|---|---|---|
| C | 1630(100) | 1460(90)  | 1900(117) |
| C | 1610(100) | 1550(96)  | 1810(112) |
| C | 1640(100) | 1870(114) | 2180(133) |
| C | 1740(100) | 2080(120) | 2240(129) |
| C | 1660(100) | 2190(132) | nm[2] |
| D | 1270(100) | 1520(120) | nm |
| H | 1390(100) | 2470(178) | nm |
| K | 2790(100) | 3200(115) | 3240(116) |
| K | 2230(100) | 2490(112) | 2470(111) |
| O | 820(100)  | 840(102)  | 1180(144) |
| O | 830(100)  | 990(119)  | 1210(146) |
| L | 2020(100) | 1630(81)  | 1850(92) |
| L | 660(100)  | 290(44)   | 460(70) |
| G | 2220(100) | 2260(102) | nm |
| B | 1880(100) | 2260(120) | 2280(121) |

Compressive Strength at 1 Day, psi[1]

TABLE IIb

Results of 7 Day Strength Tests with Laboratory Ground Portland Cements

| Clinker | Control | TIPA | TEA |
|---|---|---|---|
| C | 4420(100) | 4680(106) | 4520(102) |
| C | 4150(100) | 4840(117) | 4610(111) |
| C | 5040(100) | 6360(126) | 6120(121) |
| C | 5250(100) | 6270(119) | 5480(104) |
| C | 5170(100) | 6280(121) | nm[2] |
| D | 4740(100) | 5840(123) | nm |
| H | 4750(100) | 6020(127) | nm |
| K | 6150(100) | 6650(108) | 6030(98) |
| K | 5230(100) | 6390(122) | 5950(114) |
| O | 3990(100) | 3850(97)  | 4540(114) |
| O | 3990(100) | 4220(106) | 4240(106) |
| L | 6010(100) | 5640(94)  | 4960(83) |
| L | 4980(100) | 4370(88)  | 4220(85) |
| G | 5690(100) | 6160(108) | nm |
| B | 6280(100) | 7020(112) | 6190(99) |

Compressive Strength at 7 Day, psi[1]

TABLE IIc

Results of 28 Day Strength Tests with Laboratory Ground Portland Cements

| Clinker | Control | TIPA | TEA |
|---|---|---|---|
| C | 5860(100) | 6760(115) | 5640(96) |
| C | 6050(100) | 7090(117) | 6260(105) |
| C | 7350(100) | 8010(109) | 7720(105) |
| C | 7310(100) | 7420(102) | 6800(93) |
| C | 7240(100) | 8100(112) | nm[2] |
| D | 6850(100) | 7460(109) | nm |
| H | 6630(100) | 7990(121) | nm |
| K | 7610(100) | 8120(107) | 7170(94) |
| K | 7370(100) | 7850(107) | 7260(99) |
| O | 6080(100) | 6630(109) | 6890(104) |
| O | 6630(100) | 6820(103) | 6300(95) |
| L | 7300(100) | 6520(89)  | 6340(87) |
| L | 6610(100) | 5530(84)  | 5160(78) |
| G | 7030(100) | 7680(109) | nm |
| B | 7860(100) | 8140(104) | 7590(97) |

Compressive Strength at 28 Day, psi[1]

[1] values in the parentheses are compressive strengths reported as a percentage of the control.
[2] nm = not measured

Example 3

A number of portland cements were produced to show the relationship of strength enhancement due to TIPA and the C$_4$AF content of the cement. The cement compositions were in the range 95-97% clinker and 3-5% gypsum. A total of 2500 g of cement was produced from these raw materials by revolving the mill 4000 times at 100° C. Standard mortars were produced with the cements using the procedure specified in ASTM C109 (w/c=0.485, sand/cement=2.75), with compressive strengths of 2-inch cubes made with the mortars measured at 28 days. For each clinker used, at least two cements were produced: one with no addition of any additive, and an identical one in which 0.5 g of TIPA was added to the 2500 g batch of cement (a 0.02% addition) after the initial 100 revolutions of the mill. In some cases a third cement was produced in the same way, but with 0.5 g of TEA added instead of TIPA.

In addition to the mortar tests, the C$_4$AF concentration was determined by x-ray diffraction (XRD) analysis for each of the cements. Table III illustrates the relative 28-day compressive strengths of cements containing TIPA as compared to controls (cements containing no additives) and cements containing TEA. In all cases the strength of the cement containing TIPA exceeds that of the control, except in those cements where the $C_4AF$ concentration is below 4%. This shows that the addition of TIPA is only beneficial for improving the strength of cements containing at least 4% $C_4AF$.

TABLE III

Results of Strength Tests and X-ray Analyses of Laboratory Ground Portland Cements

| Clinker | Compressive Strength at 28 Days, psi (% of control) | | | $C_4AF$ Concentration |
|---|---|---|---|---|
| | Control | TIPA | TEA | |
| C | 5860(100) | 6760(115) | 5640(96) | 8.83 |
| C | 6050(100) | 7090(117) | 6360(105) | 8.83 |
| C | 7350(100) | 8010(109) | 7720(105) | 8.83 |
| C | 7310(100) | 7420(102) | 6800(93) | 8.83 |
| C | 7240(100) | 8100(112) | nm[1] | 8.83 |
| D | 6850(100) | 7460(109) | nm | 9.99 |
| H | 6630(100) | 7990(121) | nm | 8.38 |
| K | 7610(100) | 8120(107) | 7170(94) | 7.16 |
| K | 7370(100) | 7850(107) | 7260(99) | 7.16 |
| O | 6080(100) | 6630(109) | 6890(104) | 7.22 |
| O | 6630(100) | 6820(103) | 6300(95) | 7.22 |
| L | 7300(100) | 6520(98) | 6340(87) | 3.57 |
| L | 6610(100) | 5530(84) | 5160(78) | 3.57 |
| G | 7030(100) | 7680(109) | nm | 9.13 |
| B | 7860(100) | 8140(104) | 7590(97) | 9.97 |

[1]not measured

Example 4

This example illustrates the effectiveness of TIPA as a strength enhancer when used as an admixture in cement powders. Two inch mortar cubes were produced from a number of commercially available cements using the procedure specified in ASTM C109. Additives, if used, were added to the mixing water before addition to the cement. The TIPA dosage was varied in order to determine the optimum rate of addition. Compressive strength measurements at 1, 7, and 28 days show that TIPA enhances the strength of cements when admixed, as well as when interground with cements. The results also show an optimal TIPA dosage in the region of 0.01% to 0.02%; dosages above this level show no further benefit, and in some cases may be detrimental. The data are summarized in Table IV.

Table IV

Compressive Strengths of ASTM C109 Mortars with Varying TIPA Dosages

TABLE IV

Compressive Strengths of ASTM C109 Mortars with Varying TIPA Dosages

| Cement | TIPA Dosage, % s/c | Set time hrs[2] | Compressive Strength, psi | | |
|---|---|---|---|---|---|
| | | | 1 Day | 7 Days | 28 Days |
| A | 0.0 | 3.2 | 3470 | 8030 | 9040 |
| A | 0.005 | 3.3 | 3670 | 8370 | 9280 |
| A | 0.01 | 3.1 | 3980 | 9060 | 10730 |
| A | 0.02 | 3.3 | 3790 | 8640 | 10730 |
| A | 0.03 | 3.2 | 4160 | 8410 | 10530 |
| A | 0.05 | 3.0 | 4100 | 8190 | 11020 |
| A | 0.07 | 3.3 | 3890 | 8930 | 10560 |
| A | 0.10 | 3.6 | 3880 | 8490 | 10050 |
| P | 0.0 | nm | nm | 3740 | 5100 |
| P | 0.005 | nm | nm | 4150 | 5100 |
| P | 0.01 | 4.1 | nm | 4420 | 5450 |
| P | 0.02 | 4.0 | nm | 4330 | 5360 |
| P | 0.03 | 4.3 | nm | 4430 | 5160 |
| P | 0.04 | 4.1 | nm | 4350 | 5440 |
| Q | 0.0 | 5.1 | 1650 | 4600 | 6650 |
| Q | 0.005 | 5.3 | 1700 | 4910 | 6940 |
| Q | 0.01 | 5.5 | 1730 | 5230 | 7460 |

TABLE IV-continued

Compressive Strengths of ASTM C109 Mortars with Varying TIPA Dosages

| Cement | TIPA Dosage, % s/c | Set time hrs[2] | Compressive Strength, psi | | |
|---|---|---|---|---|---|
| | | | 1 Day | 7 Days | 28 Days |
| Q | 0.02 | 5.8 | 1720 | 5180 | 7660 |

[1]Test conditions were modified slightly for the experiments with Cement A; w/c = 0.385 (not 0.485), sand/cement = 2.5 (not 2.75).
[2]Measured with RMU Automatic Recording Penetrometers.

Example 5

The results presented in examples 2 and 3 show that TIPA is generally superior to TEA in its ability to improve the 28 day strength of cements. However, a potential shortcoming of TIPA is its inability to improve the 1-day strength of cements. Since TEA is known to be a good 1-day strength enhancer but not a 28-day strength enhancer, one would expect that replacing a portion of the TIPA with TEA would improve performance of the additive at 1 day, with a corresponding decrease in 28-day strength.

In order to test this, a number of cements were produced in a laboratory-scale ball mill using clinker "C". In the first test portland cement compositions comprising 95% clinker and 5% gypsum were produced. Additives were dissolved in 10 ml of deionized water and added to the other materials in the mill after the initial 100 revolutions of the mill. A total of 4000 revolutions were used to grind each cement. Two-inch mortar cubes were produced from these cements according to the method specified in ASTM C109. The mortar cubes were tested for compressive strength at 1, 7 and 28 days. The data in Table V show that replacement of TIPA with TEA improves the 1-day strength, with the 1-day strengths of TIPA/TEA mixtures falling in between those of neat TIPA and neat TEA, as expected. Unexpectedly, however, the replacement of a fraction of the TIPA with TEA also had a positive impact on the 28-day strength. Although the 7 and 28-day strengths of the cement containing neat TEA were far below those of the cements containing neat TIPA, (and in fact was considerably below the blank at 28 days), replacing some of the TIPA with TEA improved the 7-day strengths, and at 28 days the mixed additive performed significantly better than either TEA or TIPA alone.

TABLE V

Results of Laboratory Test Grinds with TIPA/TEA Mixtures

| Additive | Dosage, % s/c | Set time, hrs[1] | Compressive Strength, psi | | |
|---|---|---|---|---|---|
| | | | 1 Day | 7 Days | 28 Days |
| none | — | 5.43 | 1740 | 5250 | 7310 |
| TIPA | 0.02 | 5.27 | 2080 | 6270 | 7420 |
| TEA | 0.02 | 4.65 | 2240 | 5480 | 6800 |
| TIPA:TEA 1:3 | 0.02 | 4.83 | 2220 | 5430 | 8070 |
| TIPA:TEA 1:1 | 0.02 | 4.65 | 2140 | 6120 | 7680 |
| TIPA:TEA 3:1 | 0.02 | 4.82 | 2060 | 6360 | 8080 |

[1]Measured with RMU Automatic Recording Penetrometers.

Example 6

Several cement samples were produced by mixing varying amounts of clinker, limestone, gypsum, and organic additives in a ball mill and grinding the mixture to a fine powder. A total of 4000 revolutions were used to grind each cement. Two-inch mortar cubes were produced from these cements according to the method specified in ASTM C109. The compressive strengths of these cubes were measured at 1, 7 and 28 days, and the results are summarized in Table VI. As is evident from the data, the substitution of limestone for 10% of the clinker (blank #2) reduced the relative 28 day strength (blank #1). The addition of diethanolamine (DEA) or triethanolamine (TEA) did not compensate the loss of strength due to the reduced clinker content. The addition of tetra(hydroxyethyl) ethylenediamine (THEED), tetra(hydroxypropyl) ethylenediamine (THPED) and triisopropanolamine produced mortars having 28-day compressive strengths in excess of the blank #1 value, with the greatest strength enhancement being produced by TIPA.

Sodium gluconate was added to a cement sample at a dosage of 0.01% together with 0.02% TIPA to test for improvement in early (1-day) and later (7 and 28-day) strengths. This sample showed substantial improvement in 1-day strength along with a small improvement in 28-day strength.

The addition of 0.02% TIPA to the 10% limestone blended cement boosts its strength to a level in excess of that achieved with the pure portland cement. For cements with a sufficient quantity of $C_4AF$ (greater than 4%), then, the addition of TIPA makes it possible to produce low cost limestone blended cements with properties similar to those of a more expensive portland cement.

Example 7

Calculation of the lowest $C_4AF$ content with which TIPA will be useful as a strength enhancer.

In the specification it was explained that the $C_4AF$ content computed by the Bogue calculation is often in error, particularly in cases where time-temperature history of the clinker melt phase allows large quantities of iron to remain in the silicate phases of the hardened product. In the following table, cement "L" is one such example. In this case, the Bogue calculation predicts a large quantity of crystalline $C_4AF$ to be present, while the XRD pattern shows that very little is actually there. Since the strength enhancing properties of TIPA depend upon the presence of $C_4AF$, it was not surprising that TIPA was ineffective with this cement. There must, then be a $C_4AF$ content threshold below which TIPA is not useful. Based on the strength enhancement data and the Bogue-calculated $C_4AF$ contents in Table VII, the threshold would appear to be somewhere above 7.4%. However, since the XRD data show that the Bogue calculation overestimates the $C_4AF$ content for cement "L", the threshold is actually considerably less than this value. In order to better define the $C_4AF$ threshold concentration, a combination of the XRD and the elemental analysis of the cements cited in prior examples was used to determine actual $C_4AF$ contents, as outlined in the specification. The data in Table VII shows that at least 4% $C_4AF$ must be present in the cement in order to achieve 28-day strength enhancement with TIPA.

TABLE VII

Correlation Between Strength Enhancement with TIPA and the Computed $C_4AF$ Concentration for 12 Cements

| Cement/Clinker | Type of Addition[1] | [$C_4AF$] From Bogue | [$C_4AF$] From calculation derived in text | 28 Day Strength of Cement with TIPA, % of Control |
|---|---|---|---|---|
| E | Ad | 8.855 | 9.263 | 123 |
| H | I.G. | 10.103 | 8.381 | 121 |
| I | Ad | 9.129 | 8.384 | 119 |
| I | Ad | 9.129 | 8.384 | 119 |
| C | I.G. | 9.159 | 8.831 | 117 |
| C | I.G. | 9.159 | 8.831 | 115 |
| F | Ad | 10.255 | 8.686 | 115 |
| C | I.G. | 9.159 | 8.831 | 112 |
| J | Ad | 8.338 | 7.649 | 109 |
| C | I.G. | 9.159 | 8.831 | 109 |
| G | I.G. | 8.794 | 8.126 | 109 |
| D | I.G. | 10.955 | 9.994 | 109 |
| K | I.G. | 7.912 | 7.162 | 107 |
| K | I.G. | 7.912 | 7.162 | 107 |
| B | I.G. | 8.338 | 9.972 | 104 |
| O | I.G. | 14.211 | 7.221 | 103 |
| C | I.G. | 9.159 | 8.831 | 102 |
| M | Ad | 0.578 | 1.350 | 91 |
| L | I.G. | 7.425 | 3.572 | 98 |
| L | I.G. | 7.425 | 3.572 | 84 |

[1]"Ad" = admixed, "I.G." - interground

TABLE VI

Results of Tests with Limestone Blended Cements (w/c = 0.485, sand/cement = 2.75)

| Clinker | Cement Composition (% by Mass) Clinker | Cement Composition (% by Mass) Limestone | Gypsum | Additive | Dose (% s/s) | Set Time (hrs) | Compressive Strength (psi) 1 Day | Compressive Strength (psi) 7 Days | Compressive Strength (psi) 28 Days |
|---|---|---|---|---|---|---|---|---|---|
| H | 95 | 0 | 5 | Blank #1 | — | 4.50 | 1760 | 4120 | 5360 |
| H | 85 | 10 | 5 | Blank #2 | — | 3.75 | 1740 | 3920 | 5010 |
| H | 85 | 10 | 5 | DEA | 0.02 | 4.08 | 1810 | 4030 | 4950 |
| H | 85 | 10 | 5 | TEA | 0.02 | 3.42 | 2170 | 4250 | 5020 |
| H | 85 | 10 | 5 | THEED | 0.02 | 3.75 | 2050 | 4310 | 5570 |
| H | 85 | 10 | 5 | THPED | 0.02 | 3.83 | 1740 | 4400 | 6120 |
| H | 85 | 10 | 5 | TIPA + Na Gluconate | 0.02 0.01 | 3.83 | 2020 | 4710 | 6580 |
| H | 85 | 10 | 5 | TIPA | 0.02 | 3.67 | 1850 | 5240 | 6500 |
| D | 95 | 0 | 5 | Blank #1 | — | 4.50 | 1340 | 3610 | 4760 |
| D | 85 | 10 | 5 | Blank #2 | — | 4.42 | 1360 | 3520 | 4690 |
| D | 85 | 10 | 5 | THEED | 0.02 | 4.25 | 2000 | 4470 | 5580 |
| D | 85 | 10 | 5 | TIPA | 0.02 | 4.17 | 1900 | 4620 | 6010 |

Example 8

Masonry cements are a special subset of the class of limestone blended cements, usually containing 45% to 60% limestone by weight. Masonry cements were produced by grinding clinker, gypsum, and limestone, in the proportions listed in Table VIII, for 5600 revolutions of a laboratory ball mill. Besides these inorganic ingredients, a triethanolamine acetate grinding aid was added to each of the cements at a dosage of 0.02% to insure that an appropriate level of cement fineness was achieved. In two cases, TIPA was also added at the 0.02% dosage. Two-inch mortar cubes were prepared from these cements, using a mortar consisting of 980 g cement, 1680 g ASTM C109 graded sand, 1680 g ASTM C185 20-30 sand, and water corresponding to the water/cement ratio listed in the table. The cubes were cured and strength testing performed following the procedure in ASTM C109. The results shown in Table VIII indicate that TIPA is an excellent 7 and 28-day strength enhancer for masonry cements containing between 45 and 60% limestone.

TABLE VIII

Results of Test Grinds with Masonry Cements

| Composition | | | | Mortar | Mortar Compressive Strength, psi | | |
|---|---|---|---|---|---|---|---|
| Clinker | Limestone | Gypsum | Additive[1] | w/c ratio[2] | 1 Day | 7 Days | 28 Days |
| 47.5 | 50 | 2.5 | none | 0.56 | 890 | 2050 | 2510 |
| 47.5 | 50 | 2.5 | 0.02% TIPA | 0.53 | 780 | 2200 | 2780 |
| 50.0 | 50 | 0.0 | none | 0.54 | 630 | 1930 | 2390 |
| 50.0 | 50 | 0.0 | 0.02% TIPA | 0.54 | 630 | 2150 | 2790 |

[1]Trimethanolamine acetate was added to each cement at a 0.02% dosage.
[2]"w/c" = water/cement ratio. This ratio was adjusted to obtain an initial mortar flow (as defined in ASTM C109) of 110 ± 5.

Example 9

Cements were produced by grinding a mixture of clinker (N) (79.3%), limestone (14.9%), kiln dust (2.9%), and gypsum (2.9%) for 2500 revolutions of a laboratory scale ball mill. TIPA (0.5 g in 2500 g of cement, or 0.02%) was added to each cement after 100 revolutions of the mill. In all but one case, an air detraining agent was also added at this stage. Mortar cubes were produced for compressive strength tests using the procedure specified in ASTM C109, and standard mortars for air content tests were produced according to ASTM C185. The results of these tests are shown in Table IX. Note that all of the tested air detraining agents were effective in lowering the air content relative to the control which only contained TIPA. The addition of the air detrainers also had the effect of improving the compressive strengths at all ages.

TABLE IX

TIPA/Air Detraining Agent (ADA) Mixtures

| ADA | ADA Dose % s/c | ASTM C-185 Blaine SSA, % | Compressive Air Content, % | Strength, psi | | |
|---|---|---|---|---|---|---|
| | | | | 1 Day | 7 Days | 28 Days |
| none | — | 401 | 9.2 | 2210 | 4430 | 4920 |
| Co-Polymer[1] | 0.004 | 392 | 8.1 | 2650 | 5150 | 5530 |
| Co-Polymer | 0.005 | 407 | 7.9 | 2670 | 4960 | 5200 |
| DF110L[2] | 0.005 | 404 | 8.1 | 2480 | 4540 | 5080 |
| Motor Oil[3] | 0.005 | 399 | 8.3 | 2490 | 4560 | 5320 |
| DIDP[4] | 0.005 | 409 | 8.2 | 2570 | 4820 | 5690 |

Notes:
[1]Co-Polymer is polyoxyethylene-polyoxypropylene block copolymer having a molecular weight of at least 2500.
[2]DF110L is a product of Air Products
[3]Motor oil used was 10W30 commercially available from Quaker State.
[4]DIDP = Diisodecylphthalate

What is claimed:

1. A strength enhanced blended cement comprising a mixture of clinker having at least 4% $C_4AF$, gypsum, 5% to 60% by weight filler or clinker substitute together with an effective amount of a strength enhancing additive to increase the 7 and 28-day strength, wherein the additive comprises triisopropanolamine.

2. The strength enhanced blended cement according to claim 1 wherein the effective amount of additive is less than 0.2%.

3. The strength enhanced blended cement according to claim 1 wherein the effective amount of additive is less than 0.1%.

4. The strength enhanced blended cement according to claim 1 wherein the effective amount of additive is between 0.005% and 0.03%

5. The strength enhanced blended cement according to claim 1 wherein the clinker contains at least 5.5% $C_4AF$.

6. The strength enhanced blended cement according to claim 1 wherein the clinker contains at least 7% $C_4AF$.

7. The strength enhanced blended cement according to claim 1 wherein the effective amount of additive is between 0.005% and 0.03% and the clinker contains at least 7% $C_4AF$.

8. The strength enhanced blended cement according to claim 1 wherein the additive comprises a mixture of triisopropanolamine and other cement admixtures selected from the group of accelerating admixtures, air entrainers, air detrainers, water reducing admixtures and retarding admixtures.

9. The strength enhanced blended cement according to claim 8 wherein the additive comprises a mixture of triisopropanolamine and a polyoxypropylene-polyoxyethylene block copolymer having a molecular weight of at least 2500.

10. The strength enhanced blended cement according to claim 8 wherein the additive comprises a mixture of triisopropanolamine and triethanolamine.

11. A cement additive which enhances the strength of hydraulic blended cements which contain a mixture of 5 to 60% filler or clinker substitute and cement clinker having at least 4% $C_4AF$, comprising triisopropanolamine in an amount effective to enhance the 7 and 28-day compressive strength.

12. A cement additive according to claim 11 wherein the effective amount of additive is less than 0.2%.

13. A cement additive according to claim 11 wherein the effective amount of additive is less than 0.1%.

14. A cement additive according to claim 11 wherein the effective amount of additive is between 0.005 and 0.03%.

15. A cement additive according to claim 11 wherein the additive comprises a mixture of triisopropanolamine and other cement admixtures selected from the group of accelerating admixtures, air entrainers, air detrainers, water reducing admixtures and retarding admixtures.

16. A cement additive according to claim 15 wherein the additive comprises a mixture of triisopropanolamine and a polyoxypropylene-polyoxyethylene block copolymer having a molecular weight of at least 2500.

17. A cement additive according to claim 15 wherein the additive comprises a mixture of triisopropano triethanolamine.

18. A process for enhancing the strength of hydraulic blended cements comprising, adding an effective amount of a strength enhancing additive to increase the 7 and 28-day strength of hydraulic blended cements which contain a mixture of 5 to 60% filler or clinker substitute and cement clinker having at least 4% $C_4AF$, wherein the additive comprises triisopropanolamine.

19. A process for enhancing the strength of hydraulic blended cements according to claim 18 wherein the effective amount of additive is less than 0.2%.

20. A process for enhancing the strength of hydraulic blended cements according to claim 18 wherein the effective amount of additive is less than 0.1%.

21. A process for enhancing the strength of hydraulic blended cements according to claim 18 wherein the effective amount of additive is between 0.005 and 0.03%.

22. A process according claim 18 wherein the additive comprises a mixture of triisopropanolamine and other cement additives selected from the group of accelerating admixtures, air entrainers, air detrainers, water reducing admixtures, and retarding mixtures.

23. A process according to claim 22 wherein the additive comprises a mixture of triisopropanolamine and a polyoxypropylene-polyoxyethylene block copolymer having a molecular weight of at least 2500.

24. A process according to claim 22 wherein the additive is interground with cement clinker.

25. A process according to claim 22 wherein the additive comprises a mixture of triisopropanolamine and triethanolamine.

* * * * *

UNITED STATES PATENT AND TRADEMARK OFFICE
CERTIFICATE OF CORRECTION

PATENT NO. : 4,943,323
DATED : July 24, 1990
INVENTOR(S) : Ellis M. Gartner, David F. Myers, James M. Gaidis It is certified that error appears in the above-identified patent and that said Letters Patent is hereby corrected as shown below:

Column 16, line 67, claim 17, delete "triisopropano" and insert

-- triisopropanolamine and --.

Signed and Sealed this

Eighteenth Day of June, 1991

Attest:

Attesting Officer

HARRY F. MANBECK, JR.

Commissioner of Patents and Trademarks